United States Patent
Tormasov et al.

(10) Patent No.: US 12,341,801 B2
(45) Date of Patent: Jun. 24, 2025

(54) SYSTEM AND METHOD OF ANOMALY DETECTION WITH CONFIGURATION-RELATED ACTIVITY PROFILES

(71) Applicant: Acronis International GmbH, Schaffhausen (CH)

(72) Inventors: Alexander Tormasov, Bremen (DE); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 327 days.

(21) Appl. No.: 18/067,019

(22) Filed: Dec. 16, 2022

(65) Prior Publication Data

US 2024/0205256 A1 Jun. 20, 2024

(51) Int. Cl.
*H04L 9/40* (2022.01)

(52) U.S. Cl.
CPC ...... *H04L 63/1433* (2013.01); *H04L 63/1416* (2013.01); *H04L 63/1441* (2013.01)

(58) Field of Classification Search
CPC ............. H04L 63/1433; H04L 63/1416; H04L 63/1441
See application file for complete search history.

(56) References Cited

U.S. PATENT DOCUMENTS

| | | | |
|---|---|---|---|
| 8,479,276 B1 * | 7/2013 | Vaystikh | G06F 21/577 713/160 |
| 9,106,694 B2 * | 8/2015 | Aziz | H04L 51/212 |
| 9,495,188 B1 * | 11/2016 | Ettema | H04L 63/0245 |
| 9,607,148 B1 * | 3/2017 | Magar | H04L 63/145 |
| 9,882,929 B1 * | 1/2018 | Ettema | G06F 21/53 |
| 10,685,115 B1 * | 6/2020 | Lieberman | H04L 63/1416 |
| 11,513,878 B2 | 11/2022 | Kulaga et al. | |
| 11,714,903 B1 * | 8/2023 | Jia | G06F 21/566 726/24 |
| 2014/0115703 A1 * | 4/2014 | Penton | G06F 21/554 726/23 |
| 2015/0295945 A1 * | 10/2015 | Canzanese, Jr. | G06F 21/55 726/23 |
| 2016/0127397 A1 * | 5/2016 | Mekky | H04L 63/145 726/23 |
| 2018/0060581 A1 * | 3/2018 | El-Moussa | G06F 21/554 |
| 2018/0060582 A1 * | 3/2018 | El-Moussa | G06N 3/044 |
| 2018/0091531 A1 * | 3/2018 | El-Moussa | H04L 63/1416 |
| 2018/0152470 A1 * | 5/2018 | Lu | H04L 63/1433 |
| 2019/0188392 A1 * | 6/2019 | El-Moussa | G06F 21/577 |
| 2020/0137085 A1 * | 4/2020 | Kostyushko | G06F 21/53 |
| 2021/0117544 A1 * | 4/2021 | Kurtz | G06F 21/566 |
| 2021/0173929 A1 * | 6/2021 | Dalvi | G06F 21/564 |
| 2021/0194925 A1 * | 6/2021 | Xiao | H04L 63/0227 |

(Continued)

*Primary Examiner* — Jason Chiang

(74) *Attorney, Agent, or Firm* — ESPE Legal Consultancy FZ-LLC

(57) ABSTRACT

An anomaly detection system uses configuration-related activity profiles, generated in course of threat samples analysis in a secure testing environment, consisting of features of system events and system configurations of endpoints and shared network assets. Backup archives and activity monitors are used to collect system events and system configurations from corporate networks to analyze them with threat pattern databases including configuration-related activity profiles.

20 Claims, 4 Drawing Sheets

(56) References Cited

U.S. PATENT DOCUMENTS

| | | | |
|---|---|---|---|
| 2021/0286873 A1* | 9/2021 | El-Moussa | G06F 21/56 |
| 2022/0321397 A1 | 10/2022 | Tormasov et al. | |
| 2023/0011004 A1* | 1/2023 | Fellows | H04L 63/1416 |
| 2023/0096108 A1* | 3/2023 | Malanov | G06F 21/554 |
| | | | 726/22 |
| 2023/0385404 A1 | 11/2023 | Berko et al. | |
| 2023/0409715 A1* | 12/2023 | Nissim | G06F 9/45533 |
| 2024/0054213 A1* | 2/2024 | Takahashi | G06F 11/07 |
| 2024/0070261 A1* | 2/2024 | Bin Huraib | G06F 21/566 |
| 2024/0121264 A1* | 4/2024 | Poley | H04L 63/1433 |
| 2024/0152615 A1* | 5/2024 | Usui | G06F 21/56 |

\* cited by examiner

SYSTEM AND METHOD OF ANOMALY DETECTION WITH CONFIGURATION-RELATED ACTIVITY PROFILES

TECHNICAL FIELD

The invention pertains to detecting anomalies in computer networks, in particular detection of malicious activity based on configuration state analysis.

BACKGROUND

There is a type of threat that is designed to infect, steal, encrypt or delete data on network resources. The distribution of the attack vector does not allow it to detect it with the required accuracy by analyzing the state, behavior, or patterns on one device, whether it is a network share, a server, or a user computer. Accurate detection of distributed attacks requires correlation of events from multiple sources that are used in the kill chain.

Cyberattacks can be linked with abnormal behavior by users and by computer systems generally, such as downloading corporate files or scanning shared storages for information. Other indicators include running scripts or sending commands to a target system when these vary from expected user behavior. In many cases, a malicious action is preceded by a configuration change on a client device, from which a malicious action is subsequently performed, such as copying or encrypting data on a network resource. Activities that may indicate an attack are called Indicators of Attack (IOA).

Correlation of all events from all systems in the corporate network is a resource-intensive operation, moreover, it does not allow creating sufficiently universal rules to detect previously unknown threats.

Signatures for static and dynamic analysis of computer programs, files and other objects of a computer system that can carry malicious functionality in order to detect a threat with sufficient levels of detection and levels of detection errors are used in a variety of security products and in research laboratories. These signatures are further used by engines of scanning subsystems of security products, such as antiviruses, firewalls, sandboxes, and other types of solutions. These systems analyze the state on one network node. Solutions such as edr, xdr and other systems capable of analyzing big data to correlate events from various systems use more universal detection rules in their arsenal that do not allow detecting a threat with an acceptable error level in order to automatically block the threat.

Improvements in the detection of distributed attacks are needed, including previously unknown attacks, that do not require the collection, storage, and correlation of an excessive set of system events from corporate network nodes.

SUMMARY

Detection of distributed activity that performs malicious operations on shared network resources from the endpoint of the network uses an extended threat database that includes not only signatures and behavior patterns that can be used to identify suspicious activity, but also characteristics that determine the threat associated with the change configuration on the endpoint from which this attack is performed. This database is populated in a secure test environment, where known threat samples are analyzed for endpoint configuration changes and further indicators of activity on shared network resources. The threat detector collects information about activity from network resources and configuration profiles of endroids and accesses the extended threat database to compare these data if network interaction between the end device and the network resource is detected, thereby eliminating the need to correlate events between sets of network subjects. In this case, the configurations are loaded from the backup archives of the corresponding end nodes of the network, which also determine the change in the configuration until the moment that suspicious activity on the shared network resource was performed.

In an embodiment, a computer implemented system and method of anomaly detection with configuration-related activity profiles tests a threat-samples collection in a secure testing environment, filling a threat pattern database with configuration-related activity profiles and detecting an anomalous configuration-related activity at a threat detector in a corporate network. Testing a threat-samples collection comprises the steps of analyzing known threat samples in a secure testing environment, collecting system events generated in the course of threat-sample operation on test shared network assets and collecting system configuration parameters changed in course of threat sample execution linked to a shared-network-asset test endpoint. Filling a threat pattern database with configuration-related activity profiles comprises extracting a feature set of tested threat samples from a system collected data, wherein the feature set characterizes malicious configuration-related activity profile, encoding extracted feature set in appropriate form for threat detector and filling a threat pattern database with encoded feature sets for threat detector. Detecting an anomalous configuration-related activity comprises collecting system events of shared network asset of the corporate network, collecting system configuration parameters of endpoints of corporate network from backup archives, determining list of linked endpoints and shared network assets and detecting anomalous configuration-related activity on linked endpoints and shared network assets by analyzing system events and system configuration parameters of linked endpoints and shared network assets.

In other embodiment a list of endpoints linked to shared network assets is determined using system configuration parameters of endpoints corresponding to access permissions for shared network assets.

In yet another embodiment a list of endpoints linked to shared-network assets is determined using system events of shared network assets corresponding to network connections.

In an alternative embodiment a shared network asset is a network storage, a website, an ftp-server, a remote computer, a mail server, or a proxy server.

In alternative embodiments the system event comprises operating system events, such as API calls, driver logs, network events, hooked operations, system metrics, bios parameters.

In an alternative embodiment the system configurations comprise hardware configuration parameters, application configuration parameters, system setting parameters, installed updates, registry keys, application files parameters, system users, running processes, system files, user files, connected networks, or active network connections.

In an alternative embodiment the threat detector is a machine-learning module, and a threat-pattern database contains a threat classification machine-learning model, trained on collected in course of threat samples testing system events and system configurations.

In alternative embodiment the configuration-related activity profile defines threat sample or class of threat samples in computer readable form.

DETAILED DESCRIPTION

Figure 1:
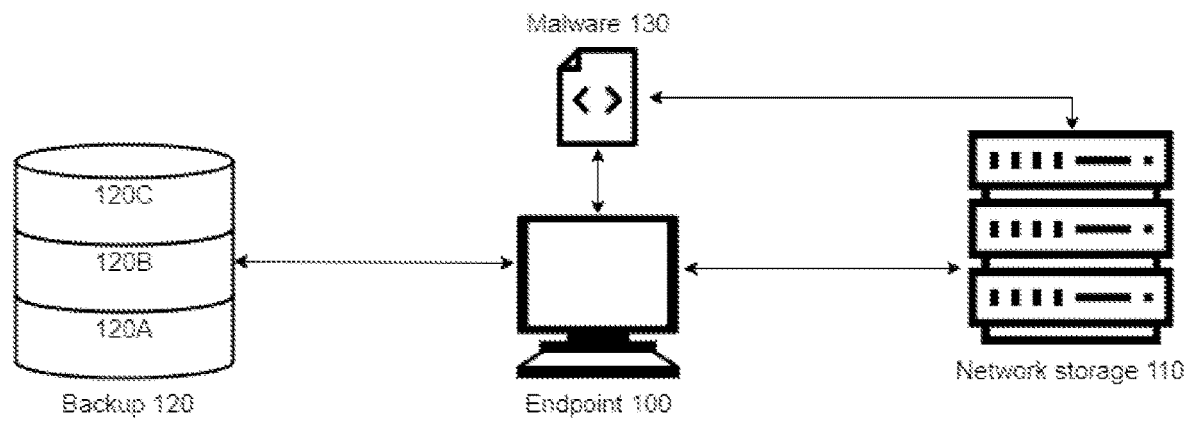
FIG. 1 shows a distributed threat model.

An overview of a distributed threat model of operation in computer networks is shown in FIG. 1. Endpoint 100 that has access to shared network resource 110 can operate with a file system on shared network asset 110. Shared network asset, referred to as network resource or shared storage or network storage or network folder, stores data or files that can be modified from the endpoint 100. Shared network asset can be a network storage, a website, an ftp-server, a remote computer, a mail server, a proxy server, or a cloud storage. Modification includes reading, copying, creating, modifying, searching, deletion, editing, saving, changing of metadata, encrypting and other operations that can be applied to network storage 110. When the endpoint 100 is infected with a threat 130, like virus, ransomware, trojan or any other type of the malware that is targeted on network shared resources, it starts scanning or searching for accessible storages 110 to steal information or to modify it. In some embodiments the endpoint 100 can be configured to save backup copies to the backup system for restoration purposes in case of any failures, but backup cannot prevent an attack.

Figure 2:
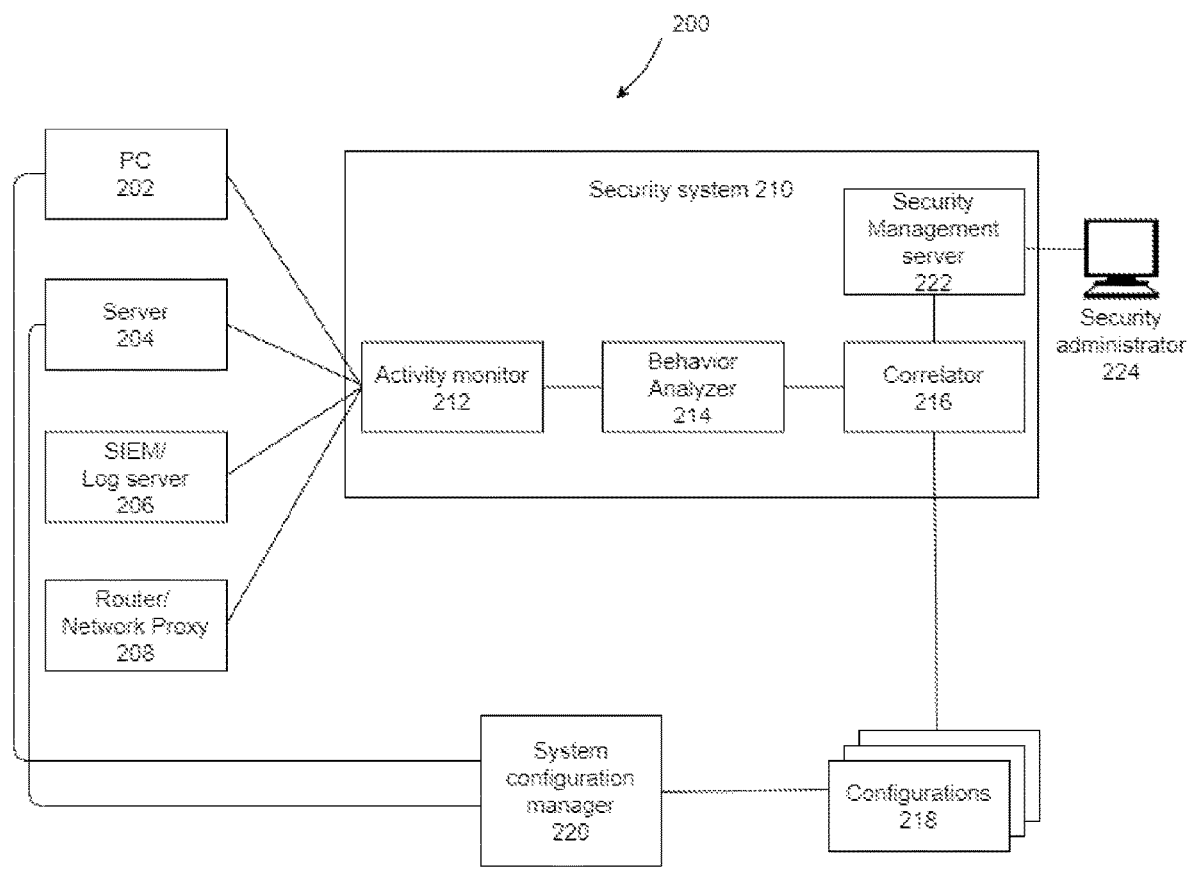
FIG. 2 shows an example of standard implementation of an anomaly detection system.

One of the implementations of an anomaly detection system known from the prior art is shown in FIG. 2. Personal computer 202, server 204, SIEM/log server 206, and router/network proxy 208 all communicate with security system 210 by way of activity monitor 212. Activity monitor 212 is coupled to behavior analyzer 214, which in turn communicates with correlator 216. Correlator 216 has access to configurations 218. Configurations 218 are received from system configuration manager 220, which stores configuration profiles of personal computer 202 and server 204.

Activity monitor 202, collects and sends events from PC 202 and server 204 to behavior analyzer 214. Events include system events such as event logs, system driver events, and proxies logs etc. Behavior analyzer 220 can be based on an expert system, signature search engine, behavior patterns comparison algorithms or machine learning techniques. Behavior analysis output or result is a security incident, alert, or an indicator of attack, that is further analyzed by correlator 216. Correlator 216 detects configuration-related incidents by correlating behavior analysis outcome with endpoint configurations using predefined security rules. The result of correlator 215's work is a detected suspicious activity, or anomaly. Anomalies related to configuration are sent to security management server 222, that are listed or displayed to system administrators using system administrator console 224. Such systems cannot use detailed detection rules that are produced to detect some particular threat, because the correlator processes all events from all connected network nodes and is not able to predict connectivity of particular network resources and cannot predict malicious activity on endpoints based on configuration changes by design. It means that such systems can only register and display security incidents for manual administrator processing and cannot detect threats with predefined detection error level to automatically block or prevent malicious activity.

Figure 3:
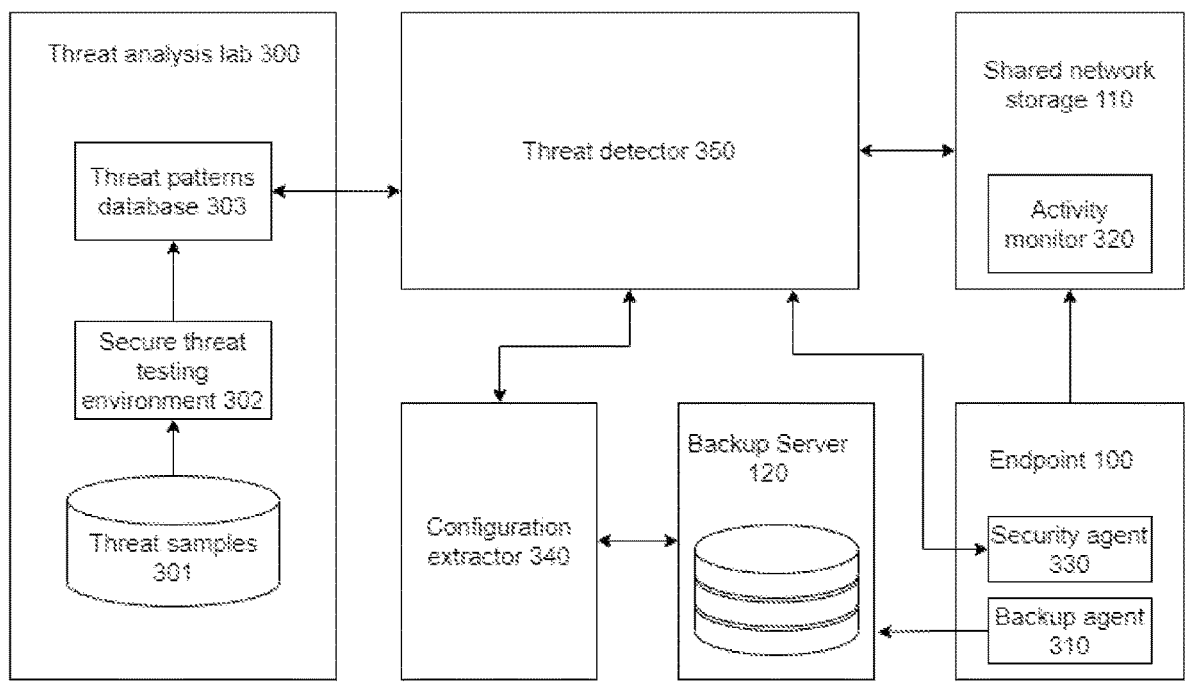
FIG. 3 shows an implementation of an anomaly detection system with configuration-related activity profiles.

An example of implementation of an anomaly detection system with configuration-related activity profiles is shown in FIG. 3. Threat analysis lab 300 is configured to analyze malware samples and threat features to generate behavior patterns, generate signatures and behavior patterns, classify threat, clustering threat, similarity searching and extract significant features of particular threat samples of a class of threats. Threat sample database 301 stores malicious objects for analysis. These objects are called threat samples and include files, scripts, memory dumps, infected documents, web pages, binary code, archives, and other forms of data that can save all threat features in a raw format. The distributed-threat samples are selected from the threat sample database 301 in the course of selection operation, clusterization process, or similarity search process. After selection, a distributed-threat sample is loaded into secure threat testing environment 302. Secure threat testing environment 302 is a replication of a common computing system that is targeted by the distributed threat and may be implemented as a sandbox, virtual machines, containers, emulators, or isolated computing systems. Analysis of the sample in a secure environment 302 is performed as a controlled execution of the sample, detailed logging of execution, or the monitoring of multiple honeypots subsystems.

The result of the analysis is a subset of threat sample features that are used to identify the threat as a class of threat or as a particular threat. The result of the analysis can also be a subset of significant features for detecting a class of threats. The selection of threats can be enriched or augmented to produce synthetic samples that can be further analyzed in scope with original samples and improve the quality of feature extraction and, as a result, improve the quality of threat detection.

Resulting significant features of the analyzed distributed threats are saved in the threat pattern database 303 in a form of numeric feature vectors, trained machine learning models, sequenced data and other data structures depending on the detection engine type that will operate with this database.

Threat analysis lab 300 is deployed in a corporate environment or out-site. In one embodiment the threat analysis lab is part of the infrastructure of a security vendor and operates in the cloud, in a dedicated datacenter, on a cluster of servers, or on a dedicated network.

Threat detector 350 is a component of a security system that utilizes threat pattern database 303 and detects threats and suspicious anomalies in corporate networks. Threat detector 350 can be implemented in a form of computer program, dedicated physical or virtual server, or set of microservices and can be installed in corporate environments, in the cloud, or on security vendor premises.

Threat detector 350 collects or receives events from shared network assets 110 using an activity monitor 320. Activity monitor is an application, operating system service, driver or network monitoring tool that is capable of reading, capturing, hooking, subscribing to, indicating, or generating events characterizing system activity on shared network assets 110. Event types of events which are collected by the activity monitor includes network connections, file system operation, storage api calls, data entropy metrics, I/O operations and other activities that are significant for threats in accordance with threat patterns.

Threat detector 350 also processes as an input system configuration in the form of parameters vector, structured data file, binary data, or other type of data package. System configuration sent to or received by a threat detector represents the current system configuration of the endpoint. In yet another example the system configuration represents the system configuration change, referred to as configuration diff, characterizing difference between two system configurations of one endpoint in different points of time or related to different system states. In other embodiments the configuration diff can represent the deviation from the baseline of multiple endpoints, grouped by the role of computer, by the user profile, by active directory structure, by connection to shared network assets.

System configuration information depending on the threat or anomaly patterns may include hardware configurations, application configurations, such as those found in settings, updates, registry keys, and application files, system configurations, including those for system users, running processes, operating system settings, installed applications, system files and user files, connected networks, and active sessions. Other sources of configuration parameters are user parameters, such as permissions, titles, and certificates.

One of the main advantages of the system is that system configuration or configuration diffs are captured from system backup archives, stored on backup server 320. Backups store changes made on protected endpoints with backup agent 310 running on each endpoint 100. Backup server 320 stores data about system history, including past and current system configurations, user activity, installed applications, connections, and other distinctive aspects of the system. Configurations from backup copies are captured by the configuration extractor 340. It can access the backup server using an API or be a functional part of the backup server. Using backup as a configuration source helps to avoid additional storage and processing resources utilization and to easily perform backward analysis. In case when the suspicious activity on shared network storage is detected first, then there is required a configuration of connected endpoint that is related to the state prior to connection. Storing system configurations for all endpoints with all chronological change directory will take a lot of storage resources and will also increase the network traffic but using backup for configuration exchange solves this problem too.

After threat detector 350 detects suspicious anomalous configuration-related activity, it assesses the possibility of the false positive verdict. Threat detector 350 can detect possible threats based on configuration change only. Threat detector 350 can detect possible threats based on activity pattern or partial activity pattern only. In case if the possibility of the threat detection is lower than predefined value, the threat detector 350 can raise an alert for system administrator at system administrator console 224 or for user of the endpoint at security agent 310. If the verdict of threat detector 350 has a high level of confidence, which means that the level of false positive is low, then the threat detector 350 blocks the execution of the malicious process and cures the endpoint from the malware using security agent 310. A detector built on a machine learning model, in the course of collecting events and configuration changes, constantly predicts the probability of a threat realization and can produce the final verdict on any stage of malicious operation, depending on the level of confidence, defined in security policy. For example, if security policy is switched to a critical level of security, then prediction of 60-70% can lead to threat detection and suspicious process termination. And if the security level is set up to the low level of security, then only a prediction of 95% will raise a response action and incident detection. The security level for each network node or endpoint can be different and may depend on the incident history, asset importance, data criticality level, user profile and other external aspects.

Figure 4:
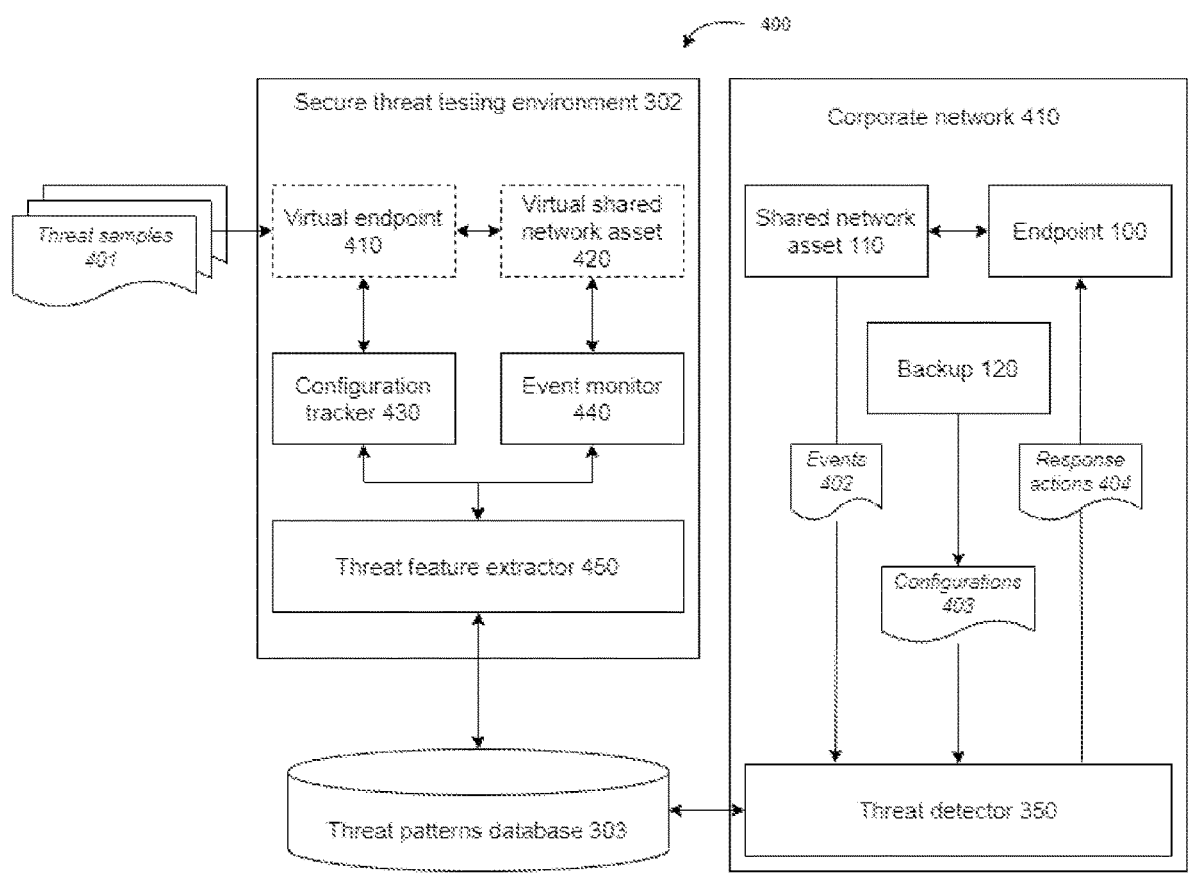
FIG. 4 shows a functional schema of an anomaly detection system with configuration-related activity profiles.

FIG. 4 shows the functional schema of the exemplary system of anomaly detection with configuration-related activity profiles. Secure threat testing environment 302 consists of virtual endpoint 410, virtual shared network asset configuration tracker 430, event monitor 440 and threat feature extractor. This example of the system is applicable to analyze such threats that are targeted on shared folders and network storages, like ransomware or spyware. The sample of the threat is loaded to virtual endpoint 410 and triggered to start execution. The malware first will prepare the system to work, for example to download and install applications, change security settings, edit registry keys, turn off system services, configure network adapter or change the mode of processing. Another example of the analyzing threat can be malware that is distributed by usb or external drives, then the virtual endpoint can be complemented with emulated external storage or virtual external device. All configuration changes made to the endpoint are tracked from the initial state in a chronological, structured, and labeled manner. For example, the malicious file can create a storage partition and then start copying files there from network storage. Then the configuration change related to partition creation will be structurally associated with copy action or time stamps. In parallel the event monitor is controlling activity on the network storage and logs all operations made in test scenarios: opening remote session or file transfer session, copying files to remote computer, modifying files, and increasing the entropy of modified data. Execution of the malicious program can be postponed until external command or system state occurs. To address this behavior the endpoint 410 and network asset 420 can synthesize needed conditions. After the runtime analysis of the threat sample finishes, the collected system configurations and activity events are encoded and loaded to threat feature extractor 450. The threat feature extractor in one embodiment is based on a machine learning model. Machine learning models train on threat samples of a particular class to determine features that characterize this class of threat. In another example the threat feature extractor can be replaced with a threat detection training module that performs training of deep learning models. Trained deep learning model or deep learning ensemble will be able to detect threats based on data flow consisting of configuration data and system activity events. In this case the trained deep learning model will be a part of the threat pattern database.

Threat detector 350 uploads a threat pattern database 303 or connects to it through the network. Threat detector 350 collects system events 402 from shared network assets 110, system configurations of endpoints 100 from backup archives stored in backup server 120 and analyses collected data for similarity with threat patterns from database 303. In particular, when a threat detector is based on machine-learning modules it utilizes trained machine-learning or deep-learning models for assessing probabilistic characteristics of the relation of the collected data to a certain class of threats. In other words, the detector classifies event and configuration parameters according to class definitions in the database or uses trained models for classification. When the threat detector detects a threat or anomalous activity it generates a response action 404 and transmits it to the endpoint 100, system administrator computer or external security operation center.

Figure 5:
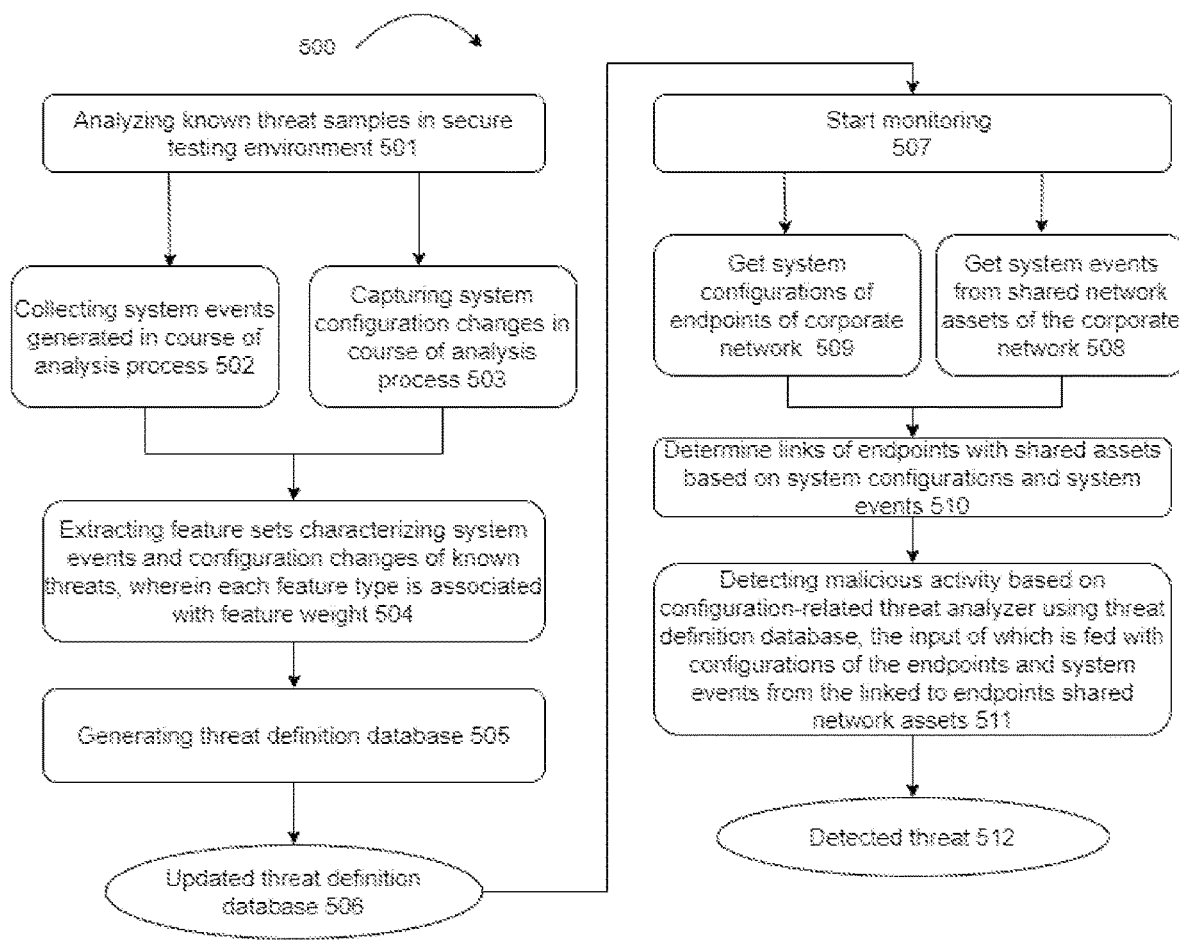
FIG. 5 shows a process for detecting distributed threats based on configuration-related activity profiles.

Example of a process 500 for detecting distributed threats based on configuration-related activity profiles is shown on FIG. 5. The process start is scheduled or starts by request, for example manually, when a new threat sample is added to a threat sample collection or when a new version of threat processing model is released. The process 500 starts with analyzing known threat samples in secure testing environment 501. The process can analyze one threat sample or multiple threats in parallel in a single testing environment or in dedicated testing environments for each sample. The step of analyzing a threat sample in a secure environment consists of preparing a testing environment and running a sample on this environment. A testing environment is prepared in accordance with the class of the threat or specifics. For example, for ransomware targeted on network shares the step of provisioning can consist of rollout of virtual machines simulating endpoints and network storage, provisioning of endpoints security configurations and network configuration to provide access from virtual endpoint to virtual network shared storage. In yet another example the provisioning step can be implemented with application and services deployment. Another embodiment of secure environment provisioning is emulation of the targeted network and endpoints.

At step 502, system events are collected in the course of the threat sample analyzing process. System events may comprise one of or combination of operating system events, API calls, driver logs, network events, hooked operations, journals or logs, collected metrics and other indications or system operation of endpoint, network storage and network environment.

At step 503, system configurations are captured from a secure environment in the course of the analyzing process. System configurations from the endpoint are collected when the execution of the threat sample starts and ends. Additionally, system configurations can be collected in particular moments corresponding to predefined system events. Based on collected system configurations, changed parameters and value of the changed parameters are determined.

At step 504, collected system events and system configurations are analyzed to extract feature sets characterizing a class of the threat or exact threat sample. For example, the tested threat sample A when executes changes registry key K, modifies network adapter parameter P, then scans network for accessible network storages, connects through ftp protocol, creates hidden partition on the storage, copies there all files with a mask *.doc and encrypts all selected files. The purpose of the feature extraction process is to identify the minimum subset of events and changed configuration parameters that are significant for this particular threat, for a class of threat. The resulting subset of features can include only registry K edited value and file modification, based on the high entropy of the modified file. This feature set allows detection of the threat based on these pairs of features. Additionally, the feature extraction step includes testing the resulting feature set on clean or whitelisted applications to avoid the false positives. In another example, a feature extraction process can be implemented with a machine learning or deep learning model that will be trained to classify threat samples receiving on the input collected system events from network share and system configuration parameters from the endpoint while running a test sample from known threats sample collection and whitelist application collection. Each class of malware will be characterized by the subset of features that will be a result of the feature extraction step.

At step 505, extracted feature sets are complemented with other threat signatures and patterns that can be utilized by different types of threat detection modules. For example, system event parameters, system events can be encoded in binary format, complemented with hash sum of the executable threat file, and stored in a consistent or structured manner in the database. In another example trained on the step 504 machine learning or deep learning classification model can be also encoded and added to the threat definition database as a distributed component.

Steps 501-505 are executed on threat analysis lab 500 and as a result produce updated threat definition database 506.

At step 507, monitoring of the corporate network storage and endpoints starts. The updated threat definition database is loaded or connected to the threat detector. Monitoring of the shared network storage 110 is performed by an activity monitor installed in communication with the storage. Monitoring of the endpoint is optional and is performed by security agent 330.

At step 509, system events characterizing system activity on network storage are collected. System event types that have to be collected can be filtered from a list of all available events by feature set defining the classes of threats, determined on the step 504. Collected events can be stored in an activity monitor folder on network storage or stored in external storage or sent to a threat detector for storage and processing.

System events from network storage are received at the threat detector. In parallel, at step 508, s system configurations of the endpoint are captured from the backup archive and loaded to the threat detector. In addition, current system configurations of the endpoint can be obtained with security agent 330. Configurations from the backup are always available, even for purposes of backward analysis, when the threat pattern or threat definition is delivered after the threat has already performed some malicious actions and must be detected based on collected and stored events and configurations, corresponding to the time period when threat actions were performed.

At step 510, linked endpoints and shared assets are determined. The link between the endpoint and network storage can be predetermined by the access table, network connection rules, security policy or it can be defined based on the system event characterizing endpoint connection to network storage.

At step 511, system events and configuration parameters from the linked endpoint and network storage are processed at the threat detector to detect a threat. Threat detectors process events and configuration parameters as a flow or as a complete set of features. In one example a threat detector processes a feature set of collected events and configuration parameters to classify the activity using a threat definition database. In particular, threat detectors can be implemented as a machine learning based module that utilizes trained classification models loaded from the threat definition database. Threat detectors are implemented as an ensemble or cascade of machine learning modules, each of which processes events using threat classification models, trained on a particular class of attack.

As a result of performing steps 507-511 suspicious activity or threat is detected 512. Suspicious activity differs from the threat in possibility metric of threat detection prediction metric. If the prediction is greater than the first predefined level, the monitored activity is determined as a threat, if the prediction is greater than the second predefined level but lower or equal to the first predefined level then the monitored activity is determined as a suspicious activity. For each type of detected incident, different response actions are specified: in response to suspicious activity a security policy of endpoint and linked network storage is switched to enhanced security policy with more security controls. A detected threat-response action includes blocking a network connection, termination of malicious process, quarantining endpoint and network storage or deletion of malicious files from the endpoint.

The invention claimed is:

1. A computer implemented method of anomaly detection with configuration-related activity profiles, the method executed on a processor, the method comprising:
   a. testing a threat samples collection in a secure testing environment, comprising:
      i. analyzing a known threat sample in the secure testing environment;
      ii. collecting system events generated in course of threat sample operation on a test shared network asset;
      iii. collecting system configuration parameters changed in course of the threat-sample operation on a shared network asset linked to a test endpoint;
   b. filling a threat-pattern database with configuration-related activity profiles, further comprising:
      i. extracting a feature set of tested threat samples from the collected system events generated and the collected system configuration parameters changed, wherein the feature set characterizes a malicious configuration-related activity profile by a minimum subset of collected system events and collected configuration parameters changed that define a given tested threat sample;
      ii. encoding the extracted feature set in a format for threat detector processing, wherein the encoding is based on a type of the threat detector; and
      iii. filling the threat-pattern database with encoded feature sets for a threat detector;
   c. detecting an anomalous configuration-related activity at the threat detector in a corporate network, comprising:
      i. collecting system events of a shared network asset of the corporate network;
      ii. collecting system configuration parameters of endpoints of the corporate network from backup archives, each backup archive including a plurality of historical copies of the system configuration parameters for an endpoint, wherein at least one of the collected system configuration parameters is related to a prior system configuration earlier than a current system configuration;
      iii. determining a list of linked endpoints and shared network assets; and
      iv. detecting anomalous configuration-related activity on the linked endpoints and the shared network assets by analyzing system events and system configuration parameters of the linked endpoints and the shared network assets; and
   d. in response to the detected anomalous configuration-activity, changing a security policy of the endpoint, blocking a network connection, terminating a malicious process, quarantining the endpoint, or deleting a file from the endpoint.

2. The method of claim 1, wherein the list of endpoints linked to shared network assets is determined using system configuration parameters of endpoints corresponding to access permissions to shared network assets.

3. The method of claim 1, wherein the list of endpoints linked to shared network assets is determined using system events of shared network assets corresponding to network connections.

4. The method of claim 1, wherein the shared network asset is at least one of network storage, website, ftp-server, remote computer, mail server, or proxy server.

5. The method of claim 1, wherein the system event comprises at least one of operating system events, API calls, driver logs, network events, hooked operations, system metrics, or bios parameters.

6. The method of claim 1, wherein the system configuration parameters comprise at least one of hardware configuration parameters, application configuration parameters, system setting parameters, installed updates, registry keys, application files parameters, system users, running processes, system files, user files, connected networks, or active network connections.

7. The method of claim 1, wherein the threat detector is a machine-learning module and the threat pattern database contains a threat classification machine-learning model, trained on the collected system events or the collected system configuration parameters.

8. The method of claim 1, wherein the configuration-related activity profile defines a threat sample or class of threat samples in computer readable form.

9. The method of claim 1, wherein the extracted feature set comprises a pair of features as only one collected system configuration parameter changed and only one collected system event generated.

10. The method of claim 9, wherein the pair of features comprises an edited registry value and a file modification based on a high entropy of the file modification.

11. The method of claim 1, wherein the at least one of the collected system configuration parameters is related to a prior system configuration is prior to the anomalous configuration-related activity modifying the endpoint.

12. An anomaly detection system with configuration-related activity profiles, the system comprising:
   a. a secure testing environment, configured to execute a threat sample from a known threat sample collection, comprising:
      i. a test endpoint linked to a shared network asset, configured to execute the threat sample and to collect system configuration parameters changed in course of threat-sample execution;
      ii. a test shared network asset, configured to collect system events generated in course of the threat-sample execution;
      iii. a threat feature extractor, configured to:
         1. extract a feature set of tested threat samples from the collected system configuration parameters changed and the collected system events generated, wherein the feature set characterizes a malicious configuration-related activity profile by a minimum subset of collected system events and collected configuration parameters changed that define a given tested threat sample;
         2. encode the extracted feature set in a format for threat detector processing, wherein the encoding is based on a type of the threat detector; and
         3. fill the threat-pattern database with encoded feature sets for a threat detector;

b. the threat-pattern database configured to store an encoded feature set of a known threat sample characterizing a malicious configuration-related activity profile;
c. a backup server, configured to store backup archives of endpoints of a corporate network and provide configuration parameters from a backup archive;
d. the threat detector configured to:
   i. collect system events of a shared network asset of the corporate network;
   ii. collect system configuration parameters of endpoints of the corporate network from the backup server;
   iii. determine a list of linked endpoints and shared network assets; and
   iv. detect anomalous configuration-related activity on the linked endpoints and the shared network assets by analyzing the system events and the system configuration parameters of the linked endpoints and the shared network assets.

13. The system of claim 12, wherein the threat detector is further configured to change a security policy of the endpoint, block a network connection, terminate a malicious process, quarantine the endpoint, or delete a file from the endpoint in response to the detected anomalous activity.

14. The system of claim 12, wherein a list of endpoints linked to the shared network assets is determined using system configuration parameters of endpoints corresponding to access permissions to the shared network assets.

15. The system of claim 12, wherein a list of endpoints linked to the shared network assets is determined using system events of the shared network assets corresponding to network connections.

16. The system of claim 12, wherein the shared network asset is at least one of network storage, website, ftp-server, remote computer, mail server, or proxy server.

17. The system of claim 12, wherein the system event comprises at least one of operating system events, API calls, driver logs, network events, hooked operations, system metrics, or bios parameters.

18. The system of claim 12, wherein the system configuration parameters comprise at least one of hardware configuration parameters, application configuration parameters, system setting parameters, installed updates, registry keys, application files parameters, system users, running processes, system files, user files, connected networks, or active network connections.

19. The system of claim 12, wherein the threat detector is a machine-learning module and threat pattern database contains a threat classification machine-learning model, trained on the collected system configuration parameters or the collected system events.

20. The system of claim 12, wherein the configuration-related activity profile defines the threat sample or class of threat samples in computer readable form.

* * * * *